April 25, 1961
J. PERRELLI
2,981,410
APPARATUS FOR SORTING PIT CARRYING DRUPE
HALVES FROM PIT FREE DRUPE HALVES
Filed Feb. 5, 1957
3 Sheets-Sheet 1
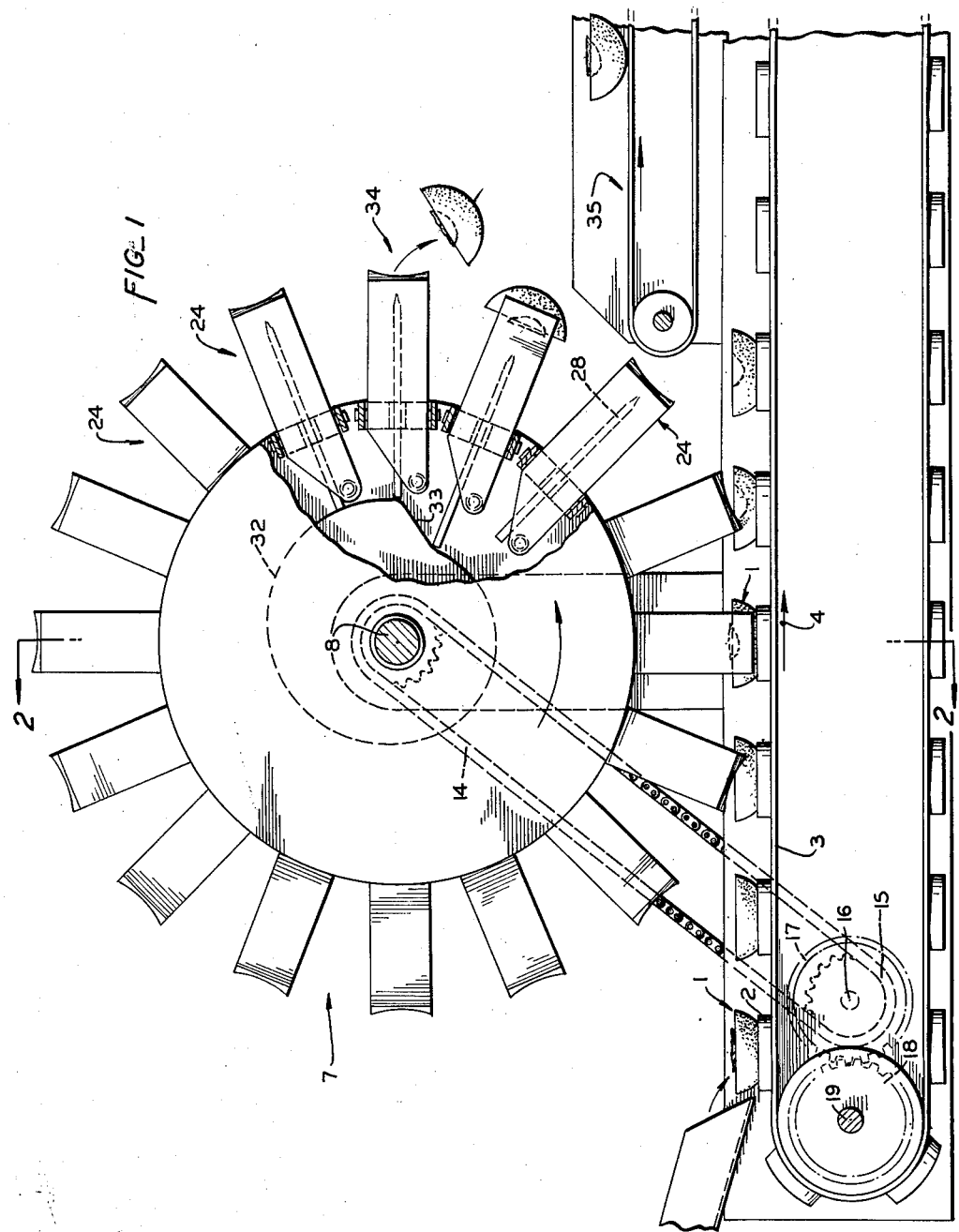
INVENTOR.
JOSEPH PERRELLI
BY
ATTORNEYS

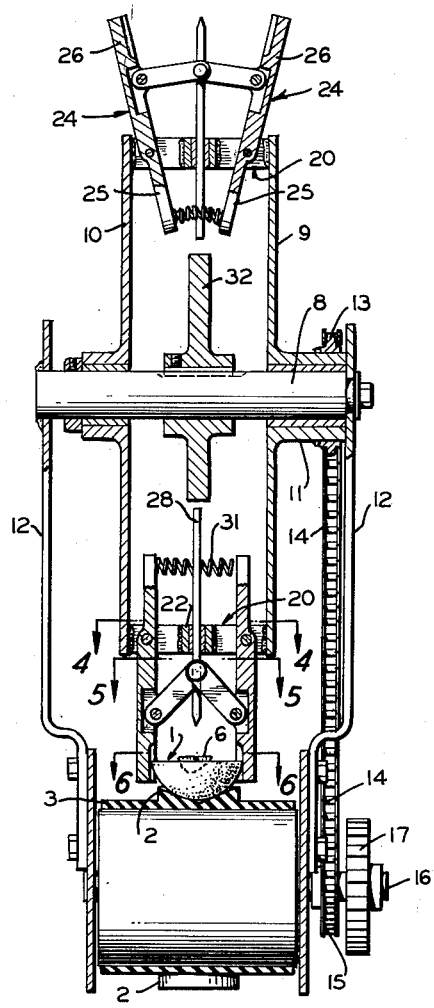
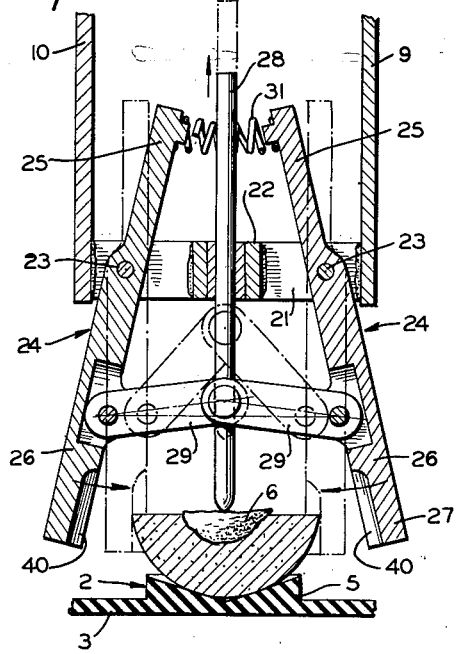
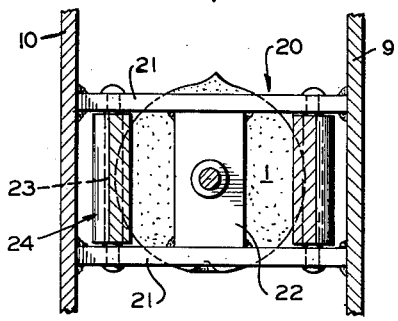

April 25, 1961  J. PERRELLI  2,981,410
APPARATUS FOR SORTING PIT CARRYING DRUPE
HALVES FROM PIT FREE DRUPE HALVES
Filed Feb. 5, 1957  3 Sheets-Sheet 3
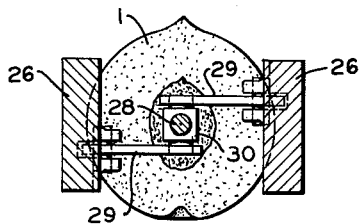
FIG_5
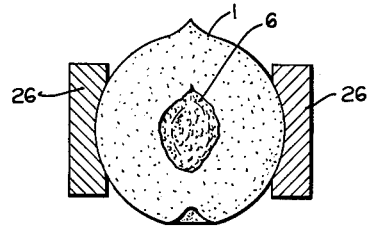
FIG_6
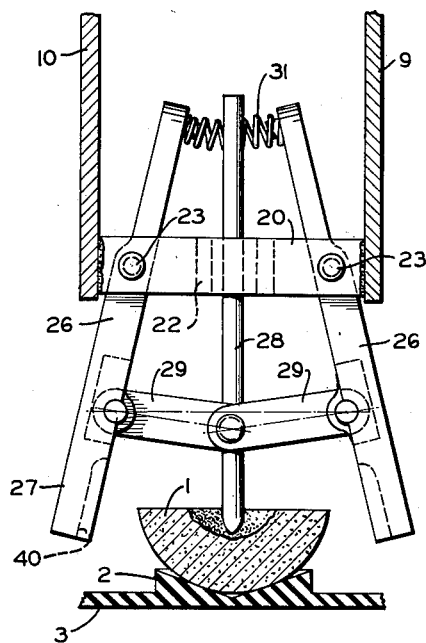
FIG_7
INVENTOR.
JOSEPH PERRELLI
BY
ATTORNEYS ically

United States Patent Office 2,981,410
Patented Apr. 25, 1961

2,981,410

APPARATUS FOR SORTING PIT CARRYING DRUPE HALVES FROM PIT FREE DRUPE HALVES

Joseph Perrelli, Richmond, Calif., assignor to Filper Corporation, Richmond, Calif.

Filed Feb. 5, 1957, Ser. No. 638,382

4 Claims. (Cl. 209—72)

This invention relates to apparatus for sorting drupe halves having pits or pit halves therein from drupe halves that are free therefrom and has for one of its objects the provision of such apparatus that will quickly and efficiently sort such drupe halves without injury to the halves so that the drupe halves that have pits or half pits therein may be quickly removed from the others for removal of said pits or pit halves therefrom.

In the art of pitting clingstone peaches, there are pitters of the type that first split the drupes including the pits, so that the drupe halves will each have a half pit therein, and these drupe halves are all moved to a pitting station where the pit halves are cut from the drupe halves that carry them. This type of pitter has recently been superseded to a great extent by a totally different type of pitter in which the whole pits are held while the drupe halves are twisted therefrom.

In this latter type of pitter it sometimes happens that the pit in the drupe is split during its ripening on the tree, and the pit is not held while the halves are twisted with the result that half of the pit remains in each of the separated halves of the drupe. Also there are times when the whole pit remains in one half of the drupe, although freed from the other half.

The result of the foregoing is that some of the drupe halves leaving the pitter may have half or whole pits therein, and these are now separated from those that are free from such half or whole pits by operators that inspect the halves as they are moved along a path of travel.

Conventional apparatus is available in the fruit industry for arranging drupe halves with their pit cavities, directed either upwardly or downwardly, as desired, irrespective of whether the cavities have pits or pit halves therein.

One of the objects of the present invention is the provision of means for mechanically and automatically detecting the presence of whole or half pits within the pit cavities of drupe halves as such drupe halves are moved along a path of travel and then mechanically and automatically effecting the removal of such drupe halves as have pits or pit halves therein from the remainder.

Other objects and advantages will be obvious from the description and drawings.

In the drawings, Fig. 1 is a side elevational view, partly broken away, showing a sorting apparatus adapted to carry out the objects of the invention;

Fig. 2 is a sectional view taken along line 2—2 of Fig. 1;

Fig. 3 is an enlarged fragmentary sectional view showing the pit detecting and drupe gripping means with the latter having been tripped to move to drupe gripping relation;

Fig. 4 is an enlarged sectional view taken along line 4—4 of Fig. 2;

Fig. 5 is an enlarged sectional view taken along line 5—5 of Fig. 2;

Fig. 6 is an enlarged sectional view taken along line 6—6 of Fig. 2;

Fig. 7 is a part sectional and part elevational view showing the pit detecting means and drupe engaging means in connection with a drupe not having a pit or pit half therein.

In detail, the drupe halves are generally designated 1, and are disposed in supports 2 of a conveyor 3 with their pit cavities directed upwardly. The conveyor, as seen in Fig. 1, is actuated by any suitable power means for movement in the direction of the arrow 4.

Each support 2 is formed with a generally conically sided upwardly directed recess 5 (Fig. 3) in its upper side so that different sized drupe halves will be automatically centered on each support.

In this connection, it is pertinent to say that the pit or pit half 6 (Fig. 3) in a drupe half, is normally substantially centrally positioned within the half. Hence it is not essential that the stem and blossom ends be oriented with respect to the direction of travel of the halves on the conveyor.

Positioned over the conveyor and above the path of travel of the supports 2 and fruit halves 1, is the pit detecting and drupe removing device generally designated 7 (Fig. 1).

The device 7, as illustrated in Fig. 1, is a rotary device, being supported for rotation on a fixed shaft 8 (Fig. 2). Said device 7 may comprise spaced opposed plates 9, 10 having hubs 11 therein through which shaft 8 extends.

Members 12 support the shaft 8 at its ends and a sprocket wheel 13 on one of the hubs 11 is connected by a chain 14 with a sprocket wheel 15 on a shaft 16. A gear 17 on said shaft 16 is in mesh with a gear 18 on conveyor shaft 19 so that the rotation of the device 7 will be synchronized with the movement of the conveyor.

The spaced opposed plates 9, 10 are held in spaced opposed relation by a plurality of cross members 20 (Figs. 2 to 4) that are equally spaced from shaft 8 and from each other adjacent to the peripheral outer edges of said plates. These cross members may each comprise a pair of spaced parallel pieces 21 (Fig. 4) secured at their ends to plates 9, 10 and joined by a central cross piece 22.

Pivots 23 extending between the ends of each pair of pieces 21 pivotally support a pair of drupe engaging members 24. These members 24 project to opposite sides of the pivots, one of ends 25, hereinafter called "inner" ends, being disposed between plates 9, 10 (Fig. 3) and extending generally toward shaft 8, and their opposite or outer ends 26 projecting radially outwardly of the outer edges of plates 9, 10.

The said opposite ends 26 terminate at their outermost end portions in drupe gripping portions 27 having generally opposed concavely curved arcuate surfaces 40 that are adapted to generally conform to the curved convex outer contour of the drupe halves to be gripped or held therebetween.

The cross piece 22 extending between each pair of cross members 20 is formed with a central bearing in which is slidably supported a pit engaging rod 28. Each rod 28 extends radially relative to the axis of shaft 8, and a pair of toggle links 29 are pivotally connected at one of their ends with a block 30 secured to said rod (Fig. 5), while their opposite ends are pivotally connected with the outer ends 26 of the drupe engaging members 24 at points equally spaced from pivots 23 and from the surfaces 40. An expansion spring 31 extends between the inner ends 25 of the drupe gripping members 24. If desired a pair of springs 31 may be used, one at either side of the inner end of each rod 28.

Each rod 28 preferably has a pointed outer end, and when each rod is moved radially outwardly so that the toggle links extend slantingly outwardly from their connections with the drupe gripping members 24 as seen in Fig. 7, the spring or springs 31 will be under compression urging the rod 28 outwardly. However, upon pushing the rod 28 radially inwardly until the pivotal connections between the links 29 and rod 28 pass the line extending between the pivots at the outer ends of said links, the expansive force of the spring 31 will quickly move the inner ends 25 of the drupe gripping members 24 apart, thus moving their drupe engaging surfaces 28 toward each other.

Stationarily secured on the shaft 8 between plates 9, 10 and in the same plane as that in which the rods 28 are disposed, is a cam 32 (Fig. 1). This cam has a low side that is adjacent to the conveyor 3, and a high side that is at the side of the cam that generally faces the discharge end of the conveyor. The rotation of the pit detecting device 7 is such that the side thereof adjacent to the conveyor 3 moves in the same direction as the latter. Any of the rods 28 that may be moved radially inwardly at the conveyor will be re-set in their outer positions by the engagement between such rods and the rise 33 of cam 32 that connects the low side of the cam with the high side, and at the same time the drupe engaging members will be opened at the point generally indicated 34.

Disposed below the point 34 is a conveyor 35 that is adapted to receive halves that may be discharged at point 34 upon the opening of the drupe engaging members 24. This conveyor is actuated by any suitable means for carrying the halves deposited therein in a direction away from the pit detecting device.

In operation, upon the rotation of the conveyor shaft 19 by a motor or any other suitable means (not shown), the conveyor and supports 2 therein, as seen in Fig. 1, will be moved from left to right, and at the same time the pit detecting device 7 will be rotated in a counter clockwise direction.

The timing between the pit detecting device and the conveyor is such that one of the pit detecting rods 28 will be centered over each drupe support 2 as the conveyor is moved to the right (as seen in Fig. 1). Consequently rod 28 will be centered over each drupe half 1 that is on each support.

The drupe halves are positioned on the supports 2 at the feed end of the conveyor with their pit cavities directed upwardly, and in the event a whole or half pit is in a drupe half, such pit or half pit will be engaged by the outer end of a rod 28 as the support moves below the pit detecting device. Inasmuch as the pit is hard, the pointed end of the rod 28 will not penetrate it, so the rod 28 will be lifted. Since the toggle links pass dead center at substantially the point where the outer ends of the drupe engaging members are at opposite sides of the drupe half, the drupe half having the pit therein will be gripped between the outer ends of the drupe engaging members and will be carried off the conveyor 3. The drupe engaging members 24 will be opened by the action of cam 32 as soon as the outer ends of the arms are over the conveyor 35, and the drupe half will be deposited on said conveyor 35 for carrying away. The resetting of the members 24 will also reset the pit detecting rod 28 and should the pit half adhere to the member 24 the rod 28 will push it off.

Where the halves 1 are free from pits, the pointed end of rod 28 may, in some instances, penetrate the flesh of the drupe to a small degree. This penetration is not perceptable in the finally canned fruit, since the outer end of each rod 28 is pointed. Also, this pointed outer end on each rod will not provide sufficient frictional engagement with the halves that may be penetrated thereby to cause such halves to be lifted from their supports.

It is to be understood that the specific description of the apparatus herein disclosed is not intended to limit the scope of the claims.

I claim:

1. Apparatus for sorting drupe halves having pits or pit halves therein from drupe halves that are free therefrom comprising; a plurality of equally spaced supports in a row each adapted to support a drupe half therein with its cut face directed upwardly, pit detector means over said row for detecting the pits or pit halves in drupe halves when the latter are on said supports as distinguished from the drupe halves that are free from such pits or pit halves, means actuated by said pit detector means for removing from said supports only the drupe halves containing pits or pit halves while permitting drupe halves free from pits or pit halves therein to remain on said supports, and means for causing said supports to move to and past said pit detector means and for causing said pit detector means to move into pit detecting relation with each drupe carried on each support as each support arrives at said pit detector means.

2. Apparatus for sorting drupe halves having pits or pit halves from drupe halves that are free therefrom comprising; a plurality of supports in a row each adapted to support a drupe half thereon with the cut face of each drupe directed upwardly, means for moving said supports longitudinally of said row for carrying drupes thereon in a path of travel parallel with said row, drupe detector means at a point along said row movable at said point into pit engaging relation with the pit or pit half in each drupe half on each support as the latter reaches said point and movable at said point into the pit cavity in each drupe half that is free from a pit or pit half, and drupe removing means actuated by said pit detecting means only upon engagement with a pit or pit half in a drupe half at said point for removing the drupe half having such pit or pit half therein from said path.

3. Apparatus for sorting drupe halves having pit or pit halves therein from drupe halves that are free therefrom comprising, a horizontally elongated conveyor having a row of supports thereon extending longitudinally of said conveyor for movement therewith, means for moving said conveyor longitudinally thereof, each of said supports being adapted to support a drupe half thereon, an annular row of pit detectors supported over said conveyor for revolution about the axis of said annular row, a pair of drupe gripping members at opposite sides of each pit detector supported for movement with the latter and for movement toward and away from each other, means supporting said detectors and the pairs of drupe gripping members for movement together about said axis with each pair of drupe gripping members being adapted to pass to opposite sides of a drupe half on one of said supports and with each detector being adapted to move into pit detecting relation with a drupe half that is positioned between the drupe gripping members at opposite sides of the detector in such pit detecting relation, means for moving said conveyor and said pit detectors and drupe gripping members in timed relation for positioning each detector in pit detecting relation with each drupe half and for moving the pair of drupe gripping members at opposite sides of each detector to opposite sides of each drupe half at the same time, means actuated by engagement between each pit detector and a pit or pit half upon each pit detector being in pit detecting relation with a pit or pit half for moving the pair of drupe gripping members at opposite sides of the pit detector so detecting such pit or pit half into gripping relation with the drupe half therebetween whereby such drupe half and the pit or pit half thereon will be carried away from said support, said pit detectors being movable into empty pit cavities in drupe halves that are free from pits and inoperative for actuating said drupe gripping members upon such movement of said pit detectors into such empty cavities.

4. Apparatus for sorting drupe halves having pits therein from drupe halves that are free therefrom comprising; conveyor means for supporting and for moving drupe halves along a path of travel, pit detector means along said path movable into empty pit cavities in drupe halves carried by said conveyor means as are free from pits and into engagement with pits that are retained in the pit cavities of the other drupe halves on said conveyor means, means actuated by said pit detector means for removing from said conveyor means only the drupe halves retaining pits in their pit cavities while permitting drupe halves having empty pit cavities to remain on said conveyor means, means connected with said conveyor means for causing said conveyor means to carry said drupe halves to and past said pit detector means and for causing said pit detector means to move into pit detecting relation with each drupe carried on said conveyor means as each drupe half arrives at said pit detector means.

References Cited in the file of this patent

UNITED STATES PATENTS

| | | |
|---|---|---|
| 1,348,341 | Winkley | Aug. 3, 1920 |
| 1,401,429 | Moore | Dec. 27, 1921 |
| 2,352,091 | Fedorchak et al. | June 20, 1944 |
| 2,713,419 | Hayes | July 19, 1955 |
| 2,731,129 | Carroll | Jan. 17, 1956 |
| 2,781,126 | Wood | Feb. 12, 1957 |